United States Patent
Shimada et al.

(10) Patent No.: US 12,456,174 B2
(45) Date of Patent: Oct. 28, 2025

(54) IMAGE PROCESSING APPARATUS, IMAGE PROCESSING METHOD, AND NON-TRANSITORY COMPUTER-READABLE STORAGE MEDIUM STORING PROGRAM COMPRISING ACQUIRING AN IMAGE GENERATED BY READING AN ORIGINAL, AND REMOVING NOISE FROM AN OBJECT REGION WITH A SIZE SMALLER THAN A SIZE SPECIFIED IN A FIRST THRESHOLD

(71) Applicant: CANON KABUSHIKI KAISHA, Tokyo (JP)

(72) Inventors: Naoki Shimada, Kanagawa (JP); Yuki Omagari, Tokyo (JP); Kazuya Ogasawara, Kanagawa (JP); Akitoshi Yamada, Kanagawa (JP); Shinichi Miyazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 18/077,088

(22) Filed: Dec. 7, 2022

(65) Prior Publication Data

US 2023/0196519 A1 Jun. 22, 2023

(30) Foreign Application Priority Data

Dec. 20, 2021 (JP) ................................. 2021-206259

(51) Int. Cl.
*G06T 5/70* (2024.01)
*G06V 30/12* (2022.01)
(Continued)

(52) U.S. Cl.
CPC .............. *G06T 5/70* (2024.01); *G06V 30/133* (2022.01); *G06V 30/14* (2022.01)

(58) Field of Classification Search
CPC ........ G06T 5/70; G06V 30/133; G06V 30/14; G06V 30/164
(Continued)

(56) References Cited

U.S. PATENT DOCUMENTS

| 6,119,937 A * | 9/2000 | Wang ........................ G06K 7/14 |
| | | 714/760 |
| 2006/0008151 A1* | 1/2006 | Lin ........................ G06V 10/46 |
| | | 382/190 |
| 2009/0022397 A1* | 1/2009 | Nicholson ............ G06V 30/164 |
| | | 382/272 |

FOREIGN PATENT DOCUMENTS

| JP | 2006-072639 | 3/2006 |
| JP | 2017-027365 | 2/2017 |

(Continued)

OTHER PUBLICATIONS

Office Action dated Aug. 15, 2025 in counterpart Japanese Application No. 2021-206259, together with English translation thereof.

*Primary Examiner* — Chad Dickerson
(74) *Attorney, Agent, or Firm* — Venable LLP (57) ABSTRACT

An image processing apparatus comprises: an acquiring unit configured to acquire image data generated by reading an original; a specifying unit configured to specify an object region including a predetermined object in the image data; a removing unit configured to remove, from the object region, noise with a size smaller than a size specified by a first threshold; and a setting unit configured to set the first threshold, for each object region specified by the specifying unit, in accordance with the size of the object region.

16 Claims, 9 Drawing Sheets

(51) Int. Cl.
*G06V 30/14* (2022.01)
*G06V 30/10* (2022.01)

(58) Field of Classification Search
USPC .......................................................... 382/275
See application file for complete search history.

(56) References Cited

FOREIGN PATENT DOCUMENTS

| | | |
|---|---|---|
| JP | 2019-068323 | 4/2019 |
| JP | 2019-168856 | 10/2019 |
| JP | 2019168856 A | * 10/2019 |

* cited by examiner

IMAGE PROCESSING APPARATUS, IMAGE PROCESSING METHOD, AND NON-TRANSITORY COMPUTER-READABLE STORAGE MEDIUM STORING PROGRAM COMPRISING ACQUIRING AN IMAGE GENERATED BY READING AN ORIGINAL, AND REMOVING NOISE FROM AN OBJECT REGION WITH A SIZE SMALLER THAN A SIZE SPECIFIED IN A FIRST THRESHOLD

BACKGROUND

Field

The present disclosure relates to an image processing apparatus, an image processing method, and a non-transitory computer-readable storage medium storing a program.

Description of the Related Art

In recent years, the character recognition accuracy of optical character recognition/reader (OCR) is improved by using AI. However, if an original includes noise such as dirt, dust/flaw, or set-off/ground tint, the character recognition accuracy of OCR may lower. It is therefore required to remove noise affecting the character recognition accuracy. Japanese Patent Laid-Open No. 2019-168856 proposes an image processing apparatus that specifies a print region included in a read image generated by reading a receipt or an invoice and removes, from the print region, a noise region that meets a predetermined noise condition in the specified print region.

SUMMARY

The present disclosure in one aspect provides an image processing apparatus comprising: an acquiring unit configured to acquire image data generated by reading an original; a specifying unit configured to specify an object region including a predetermined object in the image data; a removing unit configured to remove, from the object region, noise with a size smaller than a size specified by a first threshold; and a setting unit configured to set the first threshold, for each object region specified by the specifying unit, in accordance with the size of the object region.

Further features of the present disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

When removing noise from image data, it is necessary to remove only noise without erroneously removing an object such as a character or a figure. For example, in the above-described conventional technique, there is proposed recognizing, as a noise region, a print region that meets a condition that the area is smaller than the area of a character in a minimum size determined in advance and removing the noise region from the print region. However, if the size of removable noise is small, it may be impossible to remove noise that should be removed and obtain a desired noise removal result.

The present disclosure provides a technique of more appropriately performing noise removal of image data.

First Embodiment

<Outline of System>

Figure 1A:
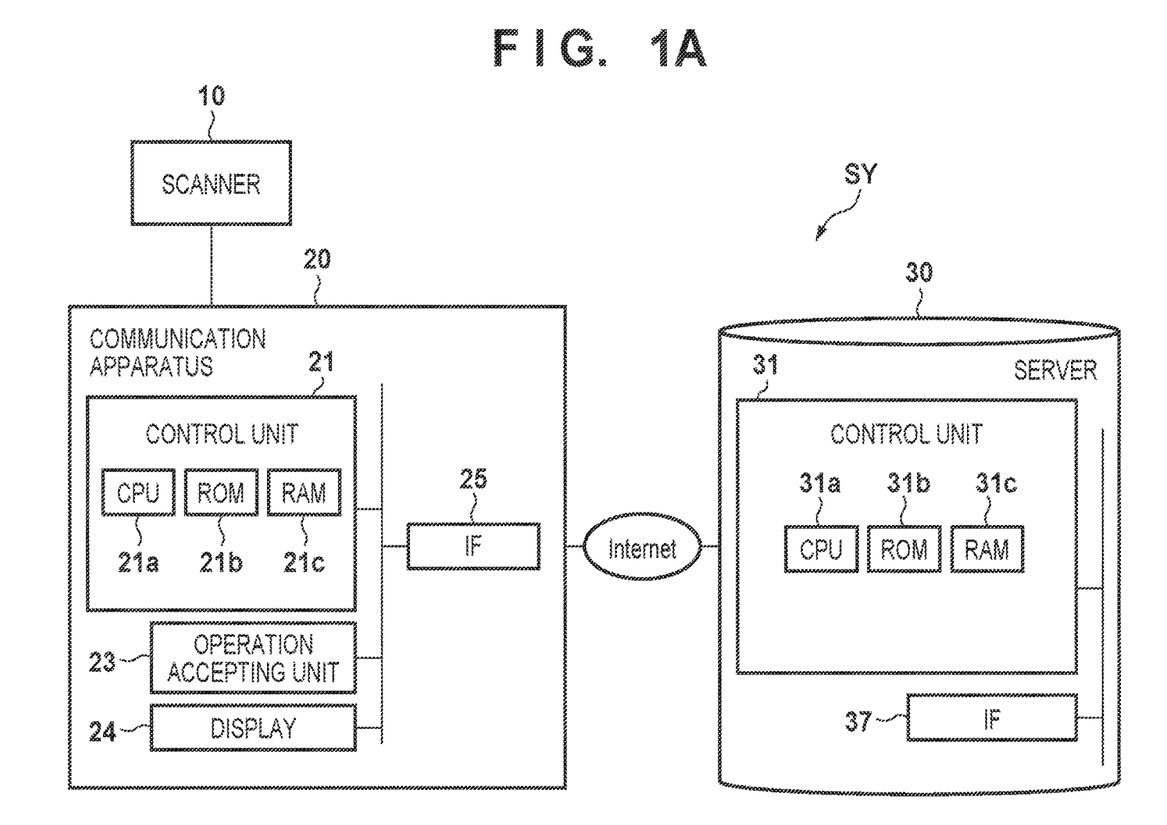
FIG. 1A is a view showing the outline of an image processing system according to an embodiment.

FIG. 1A is a view showing the outline of an image processing system SY (to be referred to as a system SY hereinafter) according to an embodiment. The system SY includes a scanner 10, a communication apparatus 20, and a server 30. For example, in the system SY, the scanner 10 transmits image data generated by reading an original to the communication apparatus 20. The communication apparatus 20 transmits the image data received from the scanner 10 to the server 30 via a network such as the Internet. The server 30 performs noise removal processing to be described later for the received image data, and provides image data as a processing result to the terminal (for example, the communication apparatus 20) of a user. The server 30 is a server capable of providing a cloud service for executing noise removal processing of image data to the user. A detailed configuration example of each element will be described below.

The scanner 10 is an image reading apparatus capable of generating image data by optically reading an original and outputting it to the outside. The scanner 10 is connected to the communication apparatus 20 wirelessly or by wire and transmits image data to the communication apparatus 20. Note that the scanner 10 may be a multi function peripheral (MFP) having a plurality of functions such as an image forming function and a FAX function in addition to the function as the scanner.

The communication apparatus 20 transmits image data received from the scanner 10 to the server 30. The communication apparatus 20 can be, for example, a personal computer (PC), a smartphone, a tablet PC, a laptop PC, or a portable telephone, or an information processing apparatus having the same processing capabilities as these and capable of communicating with the outside. The communication apparatus 20 includes a control unit 21, an operation accepting unit 23, a display 24, and a communication IF (InterFace) 25.

The control unit 21 comprehensively controls the communication apparatus 20. The control unit 21 includes a CPU (Central Processing Unit) 21*a*, a ROM (Read Only Memory) 21*b*, and a RAM (Random Access Memory) 21*c*. The CPU 21*a* (processor) executes arithmetic processing according to programs stored in the ROM 21*b* using the RAM 21*c* as a work area, thereby implementing various kinds of functions of the communication apparatus 20. In this embodiment, the programs stored in the ROM 21*b* include an application program configured to upload image data generated by the scanner 10 reading an original to the server 30.

The operation accepting unit 23 accepts user operations for implementing various kinds of processing. The operation accepting unit 23 includes, for example, physical buttons, a touch panel, a mouse, a keyboard, and the like. The display 24 displays a UI (User Interface) configured to accept operations for implementing various kinds of processing or displays various kinds of information such as a result of executed processing.

The communication IF 25 is an interface that communicates with an external apparatus. The communication IF 25 communicates with the external apparatus by at least one of wired communication and wireless communication. In this embodiment, the communication apparatus 20 is not only connected to the scanner 10 by the communication IF 25 but also connected to the Internet by the communication IF 25. Also, the communication IF 25 can execute communication by Universal Serial Bus (USB), Ethernet®, wireless Local Area Network (wireless LAN), Near Field Communication (NFC), Bluetooth®, infrared communication, or the like.

The scanner 10 and the communication apparatus 20 may be apparatuses independent of each other, as shown in FIG. 1A, but may form one apparatus. More specifically, the scanner 10 may be a multi function peripheral including the communication apparatus 20 and having a communication function with an external apparatus via the Internet.

The server 30 executes noise removal processing to be described later for image data received from the communication apparatus 20. That is, the server 30 is a detailed example of an image processing apparatus. The server 30 is implemented by one or a plurality of information processing apparatuses functioning as a server on, for example, the Internet. The server 30 includes a control unit 31 and a communication IF 37.

The control unit 31 includes a CPU 31*a*, a ROM 31*b*, and a RAM 31*c*. The CPU 31*a* (processor) executes arithmetic processing according to programs stored in the ROM 31*b* using the RAM 31*c* as a work area, thereby implementing various kinds of functions of the server 30. In this embodiment, the programs stored in the ROM 31*b* include a program configured to execute noise removal processing to be described later. The communication IF 37 performs data communication with an external apparatus via the Internet.

Figure 1B:
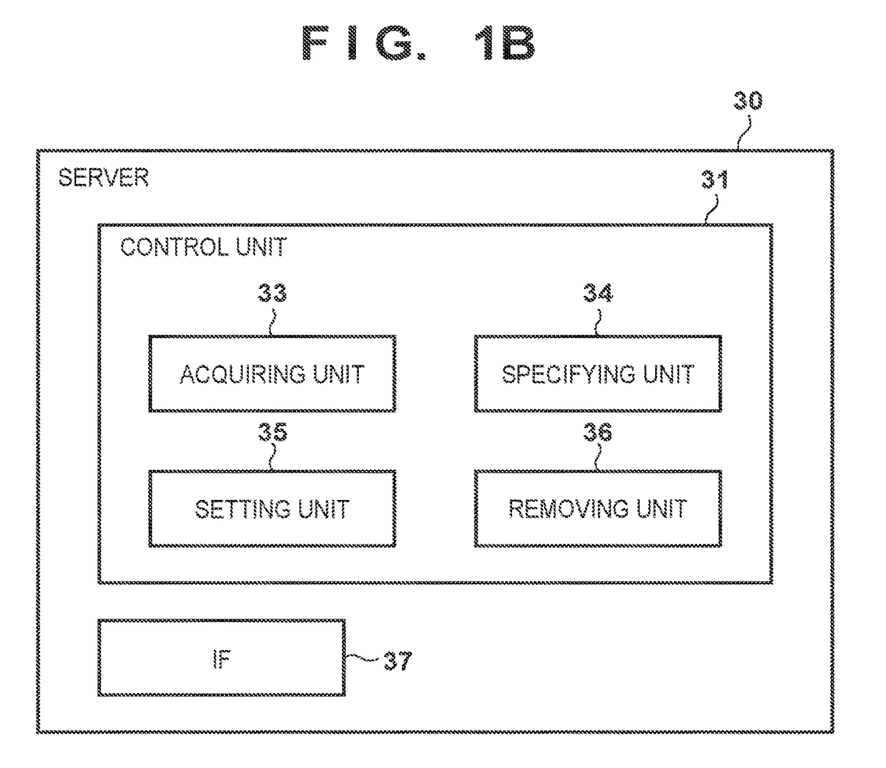
FIG. 1B is a functional block diagram of a server.

FIG. 1B is a functional block diagram of the server 30. The CPU 31*a* reads out programs stored in the ROM 31*b* to the RAM 31*c* and executes these, thereby implementing the functions of the functional units shown in FIG. 1B.

An acquiring unit 33 acquires image data generated by the scanner 10 reading an original from the communication apparatus 20 via the Internet. A specifying unit 34 specifies an object region including a predetermined object in the image data acquired by the acquiring unit 33. A setting unit 35 sets the threshold of the size of noise to be removed for each object region specified by the specifying unit 34. A removing unit 36 removes, from the image data, noise smaller than the threshold set by the setting unit 35. Note that the functional units are merely examples. The functions of the functional units may be integrated, or the function of one functional unit may be divided to provide a plurality of functional units.

Note that the functions of the control unit 21 of the communication apparatus 20 and the control unit 31 of the server 30 can be implemented by either hardware or software. For example, each of the functions of the control units 21 and 31 may be implemented by one or more CPUs executing a predetermined program using one or more memories. Alternatively, each function of the control units 21 and 31 may be implemented by a known semiconductor device such as a programable logic device (PLD) or an application specific integrated circuit (ASIC). Processing may be executed by a combination of a CPU and a hardware circuit. The control units 21 and 31 are each shown as a single element here but may be divided into two or more elements as needed.

Example of Processing of System

Figure 2:
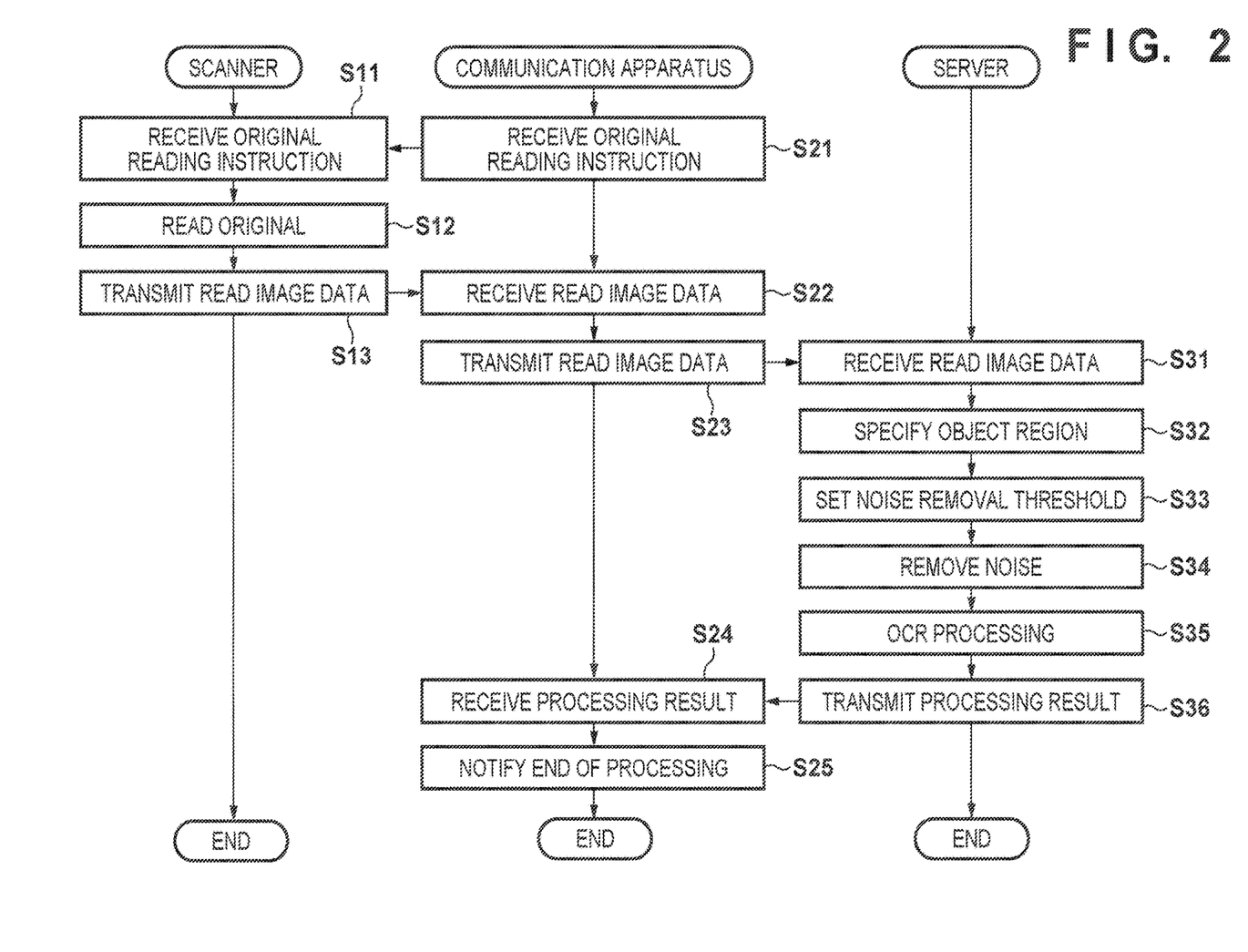
FIG. 2 is a flowchart showing an example of the operation of the entire system.

FIG. 2 is a flowchart showing an example of the operation of the entire system SY. More specifically, FIG. 2 shows an example of an operation to be performed when the user operates the communication apparatus 20 to cause the scanner 10 to generate the image data of an original and then performs OCR processing of the original using the cloud service provided by the server 30. Each step will simply be expressed as, for example, S21 below.

In S21, the control unit 21 of the communication apparatus 20 transmits an original reading instruction to the scanner 10. If the operation accepting unit 23 accepts a user operation, the control unit 21 transmits the instruction to the scanner 10 via the communication IF 25.

In S11, the scanner 10 receives the original reading instruction from the communication apparatus 20. In S12, the scanner 10 executes an original reading operation, thereby generating the image data of the original (to be sometimes referred to as read image data hereinafter). The read original can include at least one object. Here, examples of the object are a character, a number, a picture, a symbol, and a figure. In an embodiment, the object can visually be recognized discriminately from the background and is added with some meaning or information. Detailed examples of the original are a homework print, a conference material, and a form. The original can include not only a printed character or figure but also a manually written character or figure. After that, in S13, the scanner 10 transmits the read image data generated in S12 to the communication apparatus 20.

In S22, the control unit 21 receives the read image data from the scanner 10 via the communication IF 25. After that, in S23, the control unit 21 transmits the read image data received in S22 to the server 30 via the communication IF 25. For example, the control unit 21 executes an application program configured to upload the read image data to the server 30 and causes the display 24 to display a read image data transmission screen. Upon accepting selection of read image data to be transmitted and an instruction to execute noise removal processing from the user via the transmission screen, the control unit 21 transmits the target read image data to the server 30.

In S31, the control unit 31 of the server 30 receives, via the communication IF 37, the read image data transmitted from the communication apparatus 20. That is, the acquiring unit 33 of the control unit 31 acquires image data as the target of noise removal.

In S32, the specifying unit 34 of the control unit 31 specifies an object region including a predetermined object in the image data acquired in S31. In this embodiment, as the object region, the specifying unit 34 specifies a character region including a character. Details will be described later.

In S33, for each object region specified in S31, the setting unit 35 of the control unit 31 sets a threshold (to be sometimes referred to as a size threshold hereinafter) concerning the size of noise to be removed. In this embodiment, the size of noise is the two-dimensional size of noise, and the size threshold is a threshold concerning the size of noise in predetermined directions (in the following description, the short side direction and the long side direction of an object region). Details of the processing will be described later.

In S34, the removing unit 36 of the control unit 31 performs noise removal. More specifically, the removing unit 36 removes, from the object region, noise in a size smaller than the size specified by the threshold set in S33. Details will be described later.

In S35, the control unit 31 performs OCR processing for the image data after noise removal (to be sometimes referred to as image data after removal hereinafter). A known technique can be used for OCR processing, and a description thereof will be omitted.

In S36, the control unit 31 transmits the processing result. More specifically, the control unit 31 transmits the image data that has undergone the OCR processing in S35 as the processing result to the communication apparatus 20 via the communication IF 37.

In S24, the control unit 21 of the communication apparatus 20 receives the image data after OCR processing as the processing result from the server 30. After that, in S25, the control unit 21 notifies the user that the OCR processing is ended, by displaying a message representing that on the display 24.

Example of Processing of Server 30

(Specifying of Object Region)

A detailed example of processing of the server 30 will be described below.

Figure 3A:
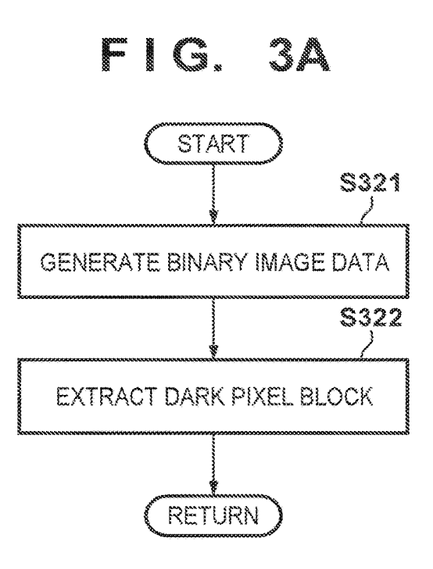
FIG. 3A is a flowchart showing an example of processing of the server.
Figure 4:
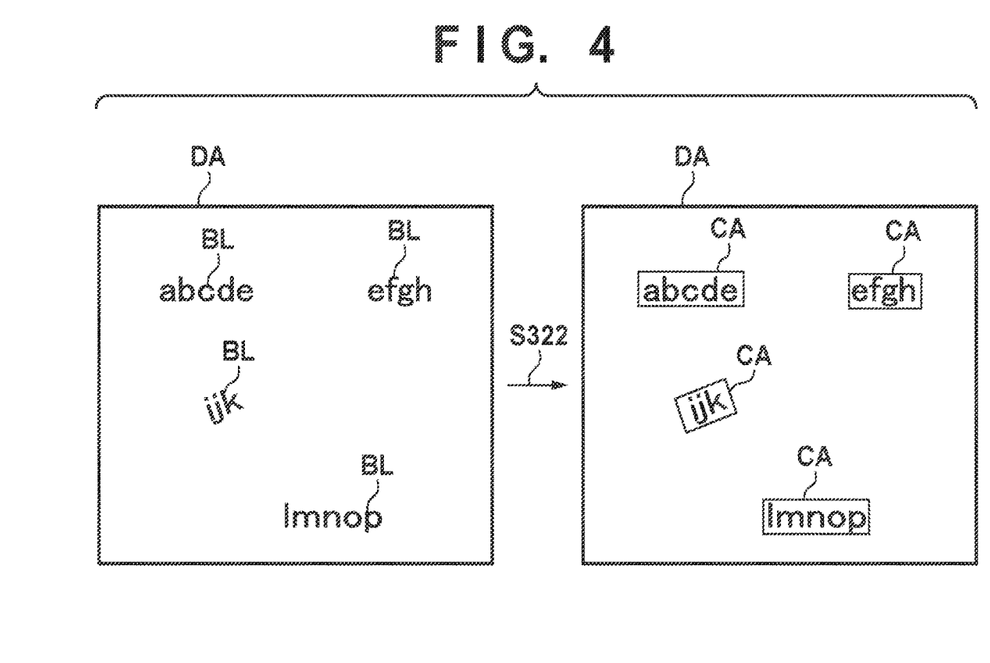
FIG. 4 is a view for explaining a state in which a character region is specified in read image data.

FIG. 3A is a flowchart showing a detailed example of processing of S32 in FIG. 2. FIG. 4 is a view for explaining a state in which a character region is specified in read image data by the processing of the flowchart of FIG. 3A. As the character region specifying method, various methods such as a rule-based method and a method using machine learning such as deep learning are proposed. Here, an example of the rule-based method will be described.

In S321, the specifying unit 34 generates binary image data (image data in which each pixel value is expressed by two tones) of a read image. A known technique can be used for the binary image data generation method, and a detailed description thereof will be omitted. As an example, binary image data is generated by comparing the pixel value of each pixel with a predetermined threshold and thus classifying the pixels into dark pixels (for example, black) and light pixels (for example, white).

In S322, the specifying unit 34 extracts a block of dark pixels (to be sometimes referred to as a dark pixel block hereinafter) from the binary image data. The dark pixel block is, in short, a set of dark pixels existing in a predetermined rectangular region. If the distance between two dark pixels falls within a predetermined range, the specifying unit 34 judges that the two dark pixels are included in a common dark pixel block. By repeating the comparison of dark pixels, the specifying unit 34 obtains, as one dark pixel block, a rectangle including all dark pixels that should be included in a common dark pixel block. Note that the dark pixel block may be the smallest rectangle including all dark pixels that should be included in a common dark pixel block, or may be a rectangle larger than the smallest rectangle by a predetermined size. By this processing, for example, words or sentences written on the same row are judged as one dark pixel block. A dark pixel block can be an object region in read image data. That is, an object region in read image data is specified by extracting a dark pixel block.

On the left side of FIG. 4, dark pixels BL existing in binary image data DA generated from read image data in S321 are shown. Here, pixels that form characters in the binary image data DA are the dark pixels BL. On the right side of FIG. 4, dark pixel blocks (that is, object regions CA) extracted in S322 are shown as rectangles of solid lines.

In this way, the specifying unit 34 performs binarization processing for the read image data to generate binary image data and extracts dark pixel blocks from the generated binary image data, thereby specifying object regions.

In a method using machine learning, it is considered that, for example, a character region as an object region is detected using a learned model generated by linking input data and supervisory data and learning these using a predetermined algorithm. As the predetermined algorithm, an algorithm such as Support Vector Machine (SVM), a decision tree, or a neural network can be used.

In this embodiment, for example, binary image data generated by binarizing read image data obtained by reading an original is used as input data, and a character region included in the binary image data is specified and output. Then, the deviation amount between the output result and data (supervisory data) representing an actual correct character region is calculated. The parameters and the like of the learned model are updated such that the deviation amount becomes smaller.

(Setting of Size Threshold for Noise Removal)

Figure 5:
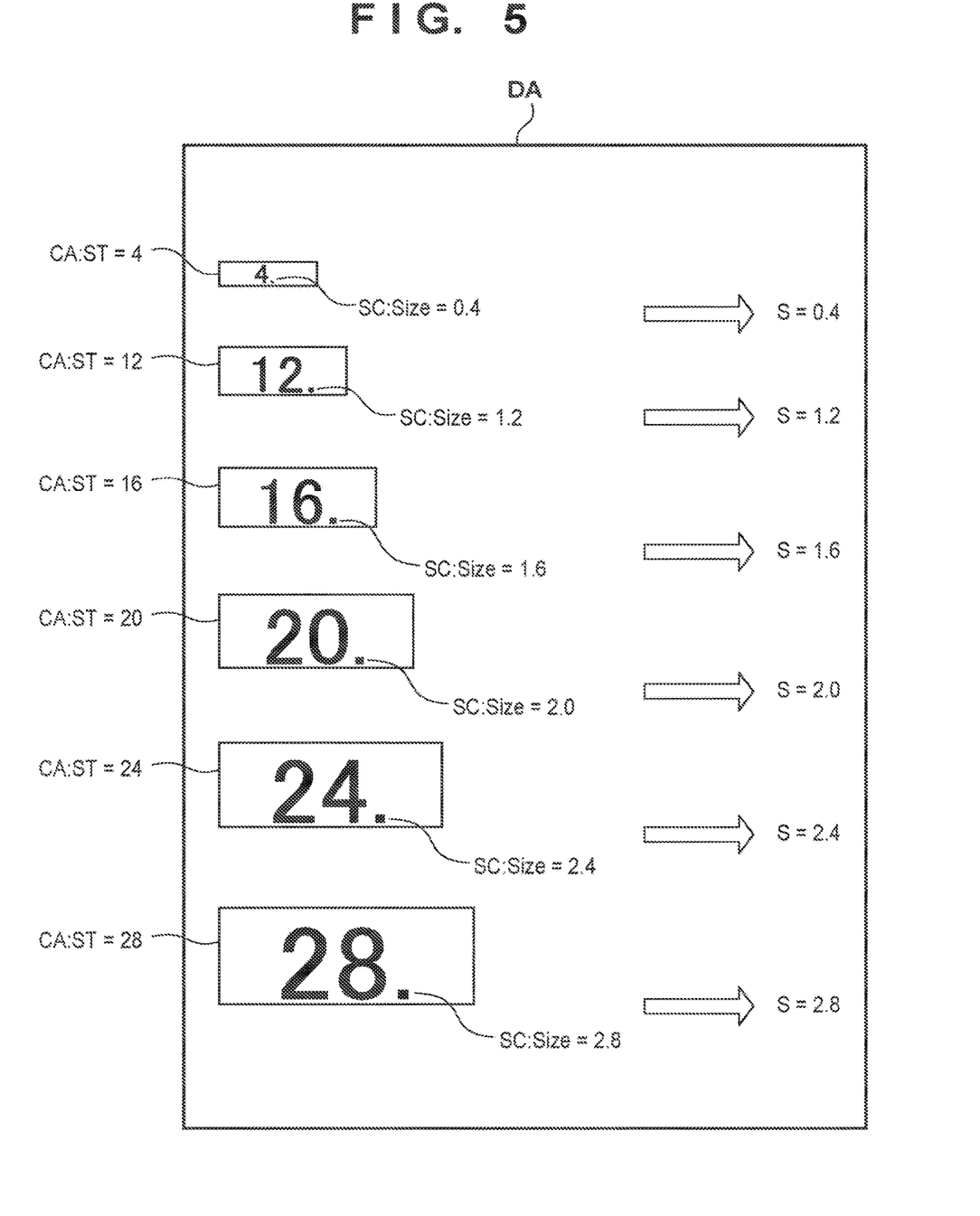
FIG. 5 is a view for explaining setting of a threshold for noise removal according to the size of an object region.

FIG. 5 is a view for explaining setting of a size threshold for noise removal according to the size of an object region in S33 of FIG. 2. FIG. 5 shows, for each of a plurality of object regions CA of different sizes, a vertical width ST and a size SC of the smallest character type (a period in FIG. 5) assumed in a case where the vertical width ST is assumed to be a character height. More specifically, if the vertical width ST is 4 pt, the size SC is 0.4 pt, and if the vertical width ST is 28 pt, the size SC is 2.8 pt. Also, FIG. 5 shows a size threshold S for each of the plurality of object regions CA.

As described above, the setting unit 35 of the control unit 31 sets the size threshold S, for each object region specified by the specifying unit 34, in accordance with the size of the object region. In this embodiment, the smaller the size of the object region is, the smaller the size threshold S set by the setting unit 35 is.

In the example shown in FIG. 5, as an example, the size threshold S is set in accordance with the size of the short side of the rectangular object region CA, which affects the size of the object region. More specifically, a size 1/10 the short side of the object region CA is set as the size threshold S. For example, if the object region CA of interest has a rectangular shape with short sides in the vertical direction and long sides in the horizontal direction, a size 1/10 the vertical width of the object region CA is set as the size threshold S. This makes it possible to remove noise smaller than a period in a case where the vertical width of the rectangle is assumed to be the height of a character. In other words, the setting unit 35 makes the size threshold S small such that such that the size specified by the size threshold S becomes smaller than the size of the smallest character type (for example, a period) in the font size of characters included in the object region. If the object region is a character string, it is estimated that the short side of the rectangle is the height of the characters, and the long side is the direction in which the characters are arranged. Hence, if the size threshold S is set based on the size of the short side, setting of the size threshold S according to the characters forming the character string is possible.

As will be described later in detail, in this embodiment, an isolated point with a size fitted in a square whose sides each have a size equal to the size threshold S set in the above-described way is removed as noise. That is, the size threshold S here can be considered as a threshold concerning the vertical and horizontal sizes of the isolated point to be described later.

Note that in this embodiment, the size threshold S common to the short side and the long side is set in accordance with the size of the short side of the rectangle of the object region, which affects the size of the object region. However, to set the size threshold for noise removal in accordance with the size of the object region, another method may be used. For example, the size threshold in the short side direction may be set in accordance with the size of the short side of the object region, and the size threshold in the long side direction may be set in accordance with the size of the long side of the object region. Alternatively, the size threshold may be set only for the short side of the object region. If the size threshold is set in this way, for example, noise generated by dirt with a linear shape long in the long side direction can be removed.

In this embodiment the size 1/10 the short side of the object region CA is set as the size threshold S. However, considering a size measurement error or the like, a size 1/10 to 1/15 the short side of the object region CA may be set as the size threshold S.

(Removal of Noise from Object Region)

Figure 3B:
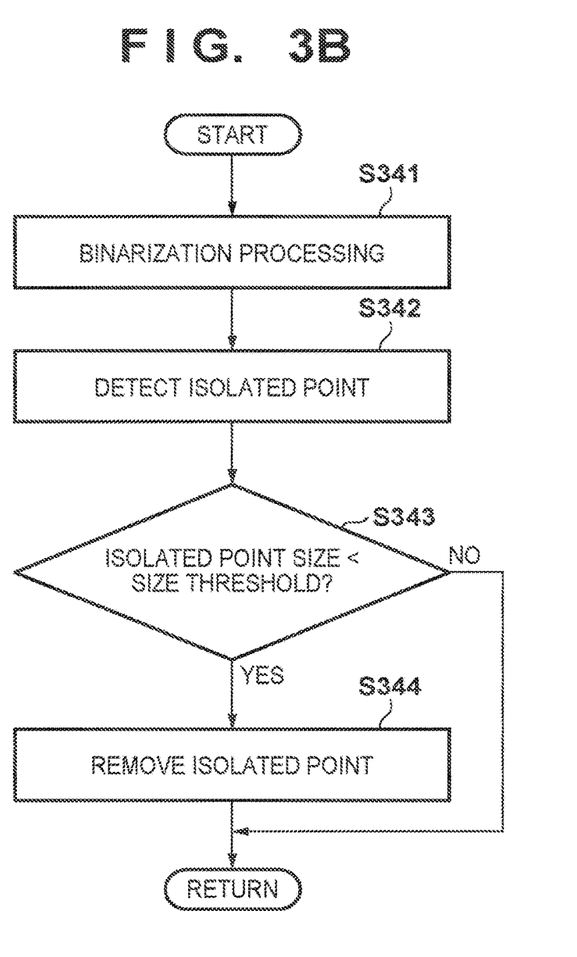
FIG. 3B is a flowchart showing an example of processing of the server.

FIG. 3B is a flowchart showing a detailed example of processing of S34 in FIG. 2. Also, FIG. 6 is a view showing a detailed example of the object region CA so as to explain the procedure of processing of S34.

In S341, the removing unit 36 of the control unit 31 executes binarization processing for the object region CA specified by the specifying unit 34 in S32. As the method of binarization processing, a known technique can be used, as in S321. Note that here, the binarization processing may be executed not only for the object region CA but also for the entire read image data. Also, if binary image data generated by performing binarization processing for the read image data to specify the object region CA in S32 exists, the binary data of the target object region CA may be acquired from the binary image data.

In S342, the removing unit 36 of the control unit 31 performs detection of an isolated point for the object region CA binarized in S341. Many methods are currently proposed as an isolated point detection method, and a detailed description thereof will be omitted here. As an example, a predetermined region is shifted by one pixel in the order of raster scan, and if the number of dark pixels existing in the region is equal to or smaller than a threshold, the dark pixels in the region are detected as isolated points. The predetermined region can be, for example, a square region whose sides each have a size equal to the size threshold S set in S33. Alternatively, as the predetermined region, in addition to the above-described square region (defined as a square region A), a square region B including the square region A and having the same center point may be used to detect an isolated point. For example, if the number of dark pixels existing in the square region A is equal to or smaller than a threshold THA, and the number of dark pixels existing in the square region B is equal to or smaller than a threshold THB, the dark pixels in the square region A may be detected as isolated points.

Figure 6:
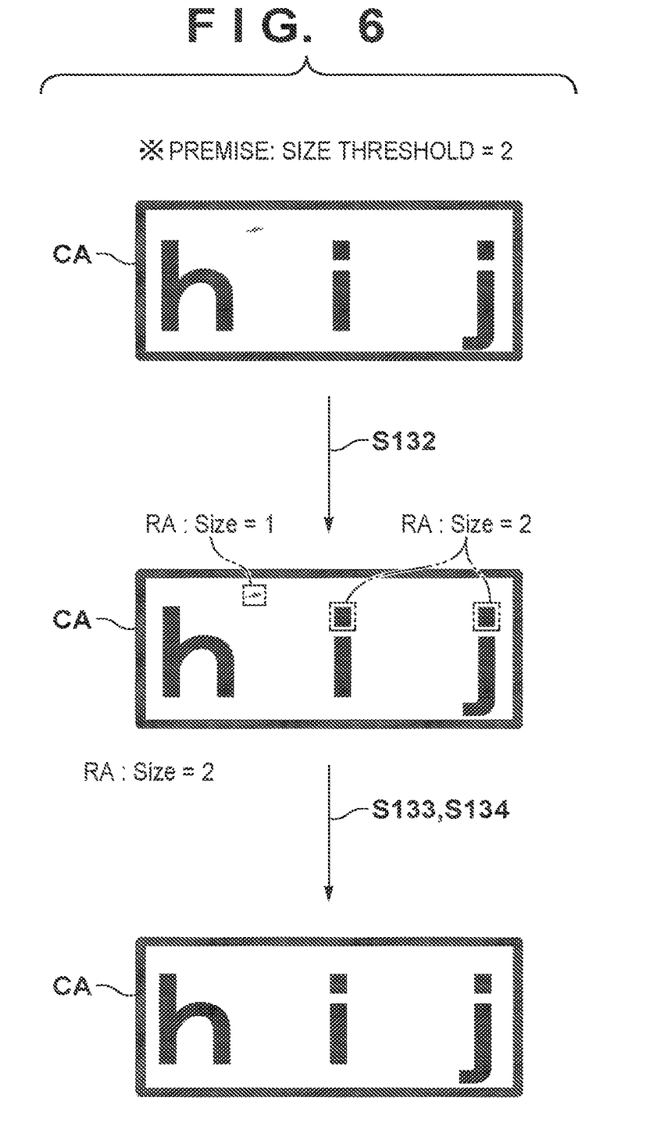
FIG. 6 is a view showing a detailed example of an object region CA so as to explain the procedure of noise removal processing.

On the top stage of FIG. 6, an example of the object region CA binarized in S341 is shown. On the middle stage of FIG. 6, isolated point regions RA each including an isolated point detected in S342 in the object region CA detected in S341 is shown. Here, the isolated point region RA is the smallest rectangular region including an isolated point. In FIG. 6, for the descriptive convenience, each isolated point region RA is surrounded by an alternating long and two short dashed line. Also, Size in FIG. 6 indicates the size of each isolated point region RA. FIG. 6 shows two isolated point regions RA whose size (the size of one side) is 2 pt, and one isolated point region RA whose size is 1 pt. Of these, the isolated point region RA of 2 pt is an element forming a character and, therefore, should not be removed, and the isolated point region RA of 1 pt is dirt and needs to be removed.

In S343, the removing unit 36 of the control unit 31 judges whether the size of the isolated point region RA detected in S342 is smaller than the size threshold S set in S33. If the size of the isolated point region RA is smaller than the size threshold S, the removing unit 36 advances to S344. Otherwise, the flowchart is ended. In this embodiment, if the isolated point region RA is fitted in a square whose sides each have a size equal to the size threshold S, it is judged that the size of the isolated point region RA is smaller than the size specified by the size threshold S.

In S344, the removing unit 36 of the control unit 31 removes the isolated point included in the isolated point region RA judged to be smaller than the size threshold S. Note that as the isolated point removing method, a known technique can be used. For example, the removing unit 36 rewrites the pixel value of the isolated point in the isolated point region RA to a light pixel value, thereby removing the isolated point. In the example shown on the lower stage of FIG. 6, the isolated point region RA of 1 pt is removed because it is smaller than the size threshold S (here, 2 pt), and the isolated point region RA of 2 pt is left without being removed because it is not smaller than the size threshold S.

As described above, according to this embodiment, the size threshold S is set, for each object region CA specified by the specifying unit 34, in accordance with the size of the object region CA. When the size threshold S according to the size of the object region CA is set, noise removal of image data can more appropriately be performed. In another viewpoint, the removing unit 36 removes noise included in the object region CA by setting the size according to the size of the object region CA to an upper limit. Since the upper limit of the size of noise to be removed complies with the size of the object region CA, a removal error of a character or the like can be suppressed. Also, the smaller the object region CA is, the smaller the size threshold S is. It is therefore possible to prevent an element forming a character from being erroneously removed if the size of the character included in the object region CA is small. If the size of the character included in the object region CA is large, relatively large noise can be removed.

Second Embodiment

The second embodiment will be described below. In the first embodiment, the size threshold is set for each specified object region in accordance with the size of the object region. Here, if the object region is a region including a figure and a character, the size of the character included in the object region is not reflected on the size threshold in some cases. In this case, the size threshold may be set to a value larger than an appropriate value for the size of the character included in the object region. As a result, an element forming the character may erroneously be removed at the time of noise removal. To prevent this, in this embodiment, noise removal is executed in accordance with the attribute of an object included in an object region. Hereinafter, the same reference numerals as in the first embodiment denote the same components, and a description thereof will be omitted.

Figure 7:
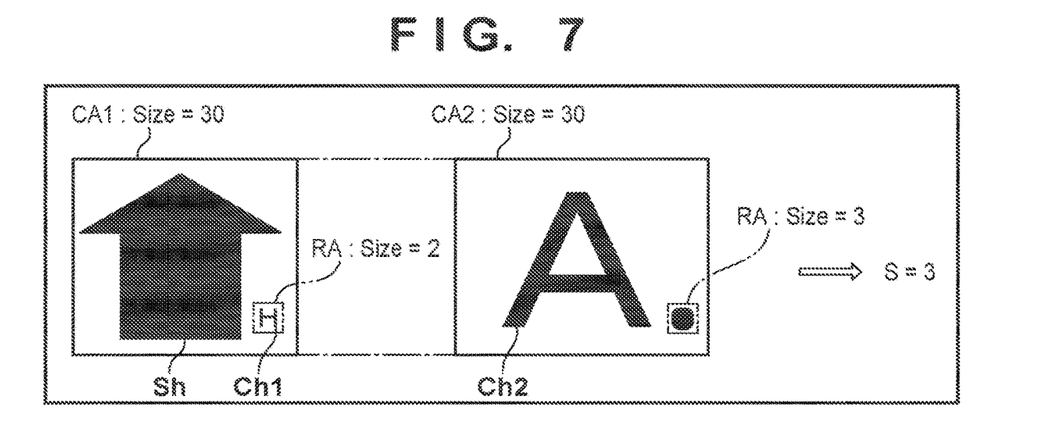
FIG. 7 is a view showing a detailed example of a state in which a character removal error occurs.

FIG. 7 shows a detailed example of a state in which a character removal error occurs in a case where an object region is a region including a character and a figure. Here, for an object region CA1 including a figure Sh and a character Ch1 and an object region CA2 including a character Ch2 and noise N shown in FIG. 7, for example, a size threshold S (3 pt) is set based on the vertical width (30 pt) of each object region. In this case, the noise N included in an isolated point region RA smaller than the size threshold S can be removed. However, since the size (2 pt) of the isolated point region RA including the character Ch2 is smaller than the size threshold S, a removal error of the character Ch2 may occur. Hence, in this embodiment, the size threshold S is changed based on a predetermined condition by processing to be described below.

Figure 8:
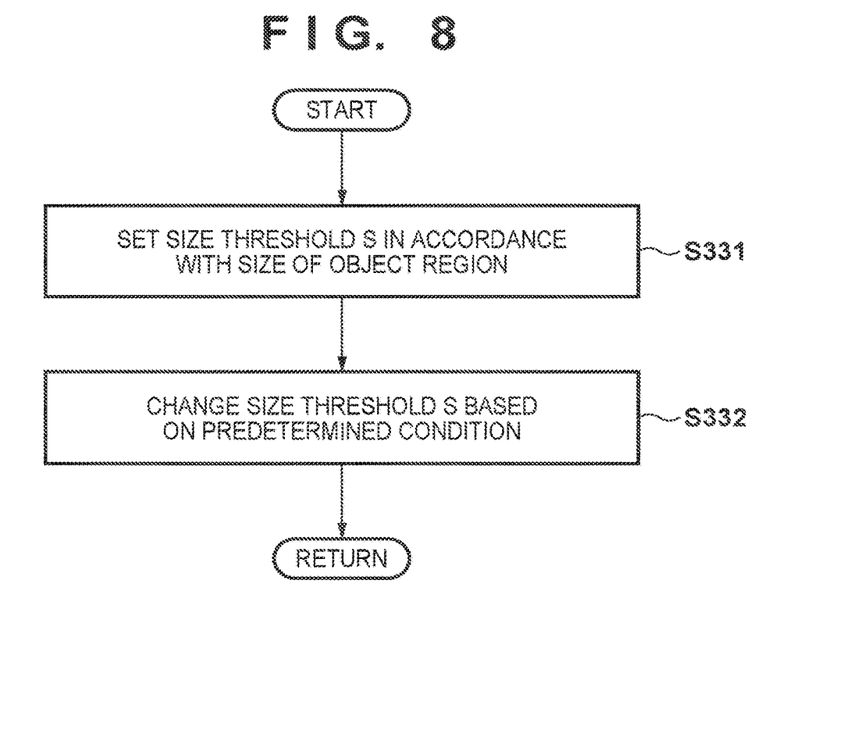
FIG. 8 is a flowchart showing an example of processing of a server.

FIG. 8 is a flowchart showing a detailed example of processing of S33 in FIG. 2.

In S331, a setting unit 35 sets the size threshold S in accordance with the size of the object region. The processing of S331 corresponds to the processing of S33 in the first embodiment.

In S332, based on a predetermined condition, the setting unit 35 changes (resets) the size threshold S set in S331.

The predetermined condition is, for example, as follows. The setting unit 35 may changes the size threshold S based on the area of each object region. For example, if the area of the object region is larger than a predetermined threshold, the size threshold S may be made smaller than the value set in S331. As an example, if the area of the object region is larger than a predetermined threshold, the setting unit 35 may decide a new size threshold SN by dividing the size threshold S set in S331 by a predetermined value (>1).

If an original includes an object region having an extremely large area, for example, an area ½ the original size, the possibility that the object region is a character region is low. Hence, if the area of the object region is equal to or larger than a threshold, it can be judged that the object region of interest is not a character region. If the object region is not a character region, the size threshold is set to a size smaller than the size threshold set in S311, thereby suppressing a removal error of a character.

Also, the predetermined condition may be, for example, as follows. The setting unit 35 may change the size threshold S based on the aspect ratio of each object region. For example, if a rectangular object region of interest has short sides in the vertical direction, the aspect ratio of the object region is represented by 1:A (>1). At this time, the setting unit 35 may set a value obtained by subtracting 1/A from the size threshold S to the new size threshold SN. If a character region is included in the object region, the character region is assumed to be formed by a plurality of characters, and therefore, the possibility that the aspect ratio of the character region is 1:1 is low. Hence, it can be judged that the possibility that the object region is a character region is low if the aspect ratio of the object region is close to 1:1, that is, if the ratio of the long side to the short side of the object region is close to 1. Hence, if the size threshold is reset to a size smaller than the size threshold set in S311 in accordance with the possibility that the object region is not a character region, a removal error of a character can be suppressed.

Note that the predetermined condition may be a combination of two conditions described above, or another condition may be combined. For example, the predetermined condition may be the ratio of the number of dark pixels to the number of pixels of the object region. That is, if the ratio of dark pixels is high, it can be estimated that a solid figure or the like is included in the object region. Hence, if the ratio of the number of dark pixels to the number of pixels of the object region is equal to or more than a threshold, the size threshold may be reset to be smaller.

As described above, according to this embodiment, if it can be judged that an object region includes a figure, the size threshold is set to be smaller as compared to a case where the object region is formed only by characters. That is, the size threshold set in accordance with the size of the object region is changed in accordance with the attribute of the object region, which is a condition other than the size. This can more appropriately perform noise removal of image data in accordance with the attribute of the object region.

More specifically, the size threshold is set for each object region of interest based on a predetermined condition, for example, the aspect ratio or area of the object region in addition to the size of the object region specified from the binary image data of read image data. Hence, if the object region is a region including an object other than a character, it is possible to reset the size threshold and suppress a removal error of a character included in the object region.

OTHER EMBODIMENTS

In the above-described embodiments, noise removal of image data is executed by the server 30. However, noise removal may be executed as preprocessing of OCR processing by the scanner 10 having an OCR function. Alternatively, removal of noise of image data may be executed by the communication apparatus 20 capable of communicating with the scanner 10. If removal of noise of image data is executed by the scanner 10 or the communication apparatus 20, a program to be executed by the control unit (not shown) of the scanner 10 or the control unit 21 of the communication apparatus 20 may be provided via the Internet or the like. In addition, the scanner 10 or the communication apparatus 20 may execute the program, thereby implementing the above-described processing without performing communication with an external server or the like via the Internet.

Also, in the above-described embodiments, the scanner 10 or a multi function peripheral having a plurality of functions in addition to the function as the scanner performs image processing for read image data generated by reading an original. However, image data generated by capturing an original by an apparatus having an image capturing function, for example, a personal computer (PC), a smartphone, a tablet PC, or a laptop PC can also be included in read image data. That is, image capturing of an original by an image capturing apparatus such as a camera can also be included in original reading.

In the above-described embodiments, in S341, read image data is binarized. However, the image data may undergo noise removal processing without binarization (as a multivalued image). This is because if a region (background region) other than characters of an original is close to a character color, the characters and the background may obtain the same pixel value by binarization processing, and character information may be lost. Hence, if processing is performed for the multivalued image, an isolated point region may be rewritten by the pixel value of the background around the isolated point region, to remove the isolated point region from the object region. If isolated point removal is performed for the multivalued image, the background of the read image does not always have a predetermined fixed pixel value (for example, the light pixel value of the binary image). Hence, if the replaced pixel values of the isolated point region and the peripheral region are different, this may give an adverse effect to the OCR character recognition accuracy, like noise. If the pixels of background are extracted from the peripheral pixel values of the isolated point region, the adverse effect that isolated point removal by a predetermined fixed pixel value gives to the OCR character recognition accuracy can be suppressed.

Figure 9:
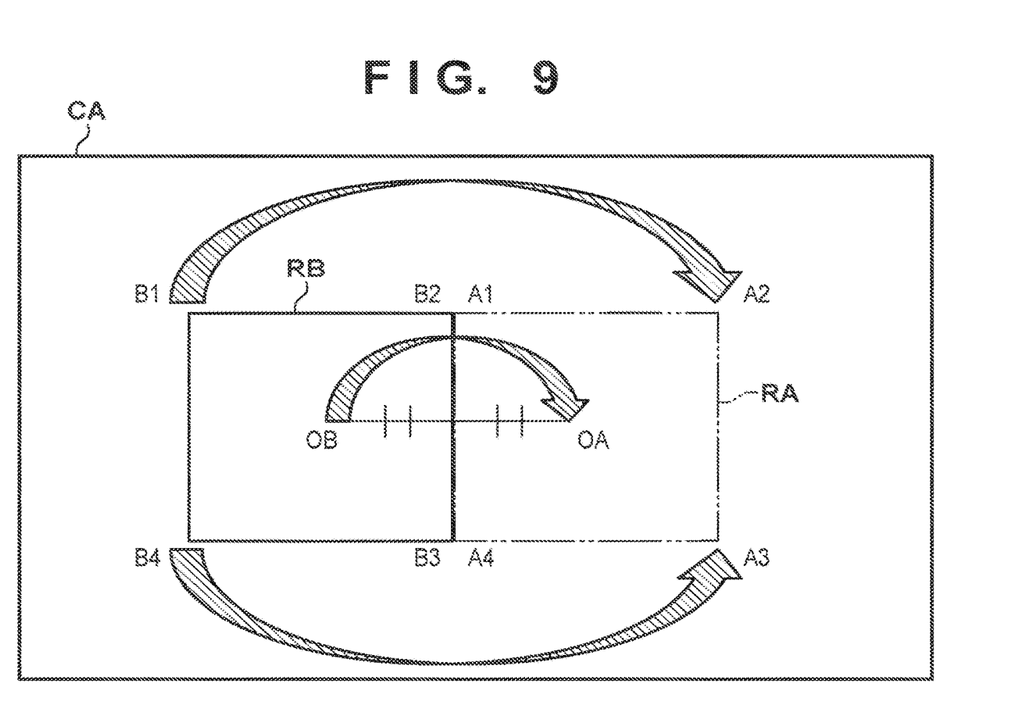
FIG. 9 is a view showing a detailed example of isolated point removal.

For example, the removing unit 36 of the control unit 31 rewrites the pixel value of an isolated point region smaller than the size threshold by the pixel value of the background extracted on the periphery of the isolated point region, thereby removing it from the object region. FIG. 9 is a view showing a detailed example of isolated point removal. FIG. 9 shows an example in which the isolated point region is filled with peripheral pixels and removed. Here, the removing unit 36 rewrites the isolated point region RA smaller than the size threshold S to a predetermined fixed pixel value (for example, the light pixel value of the binary image) such as the pixel value of a background region RB, thereby removing the isolated point from the object region. Here, the background region RB is a region that has the same shape and same size as the isolated point region RA and contacts the isolated point region RA by one side. More specifically, the removing unit 36 performs, for all pixels of the isolated point region RA, processing of rewriting an arbitrary pixel value of the isolated point region RA by the pixel value of a corresponding point in the background region RB, thereby removing the isolated point. As an example of the corresponding point, for example, a point B2 corresponds to a point A1, a point B1 corresponds to a point A2, a point B4 corresponds to a point A3, a point B3 corresponds to a point A4, and a point OB corresponds to a point OA. Thus, the removing unit 36 can rewrite the isolated point to be removed to the background.

Also, in the above-described embodiments, the size of noise is a two-dimensional size, and the size threshold is a threshold for the size of noise in a predetermined direction. However, the definitions of the size of noise and the size threshold are not limited. For example, the length of a diagonal line of the smallest rectangle including noise may be defined as the size of noise, and the size threshold may be set as a value concerning the length of the diagonal line. Alternatively, the size of noise may be the area of noise (isolated point) itself or the area of the smallest rectangle including the noise, and the size threshold may be a value concerning the area.

Furthermore, in the above-described embodiments, removal of noise from read image data is performed as preprocessing of OCR processing. However, processing mainly aiming at removing noise from read image data may be performed. For example, before read image data acquired from the scanner 10 is stored, the communication apparatus 20 may execute noise removal processing according to the above-described embodiment and store image data after noise removal as the image data of an original in the storage area of the communication apparatus 20.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206259, filed Dec. 20, 2021 which is hereby incorporated by reference herein in its entirety.

What is claimed is:

1. An image processing apparatus comprising:
at least one memory and at least one processor which function as:
an acquiring unit configured to acquire image data generated by reading an original;
a specifying unit configured to specify an object region including a first object in a predetermined type in the acquired image data;
a setting unit configured to set a first threshold to be used to remove noise from the specified object region, for each object region specified by the specifying unit, in accordance with size of the object region; and
a removing unit configured to remove, from the object region, noise with a size smaller than a size specified by the first threshold,
wherein the setting unit determines, in a case where an area of the object region is greater than a predetermined threshold, that the object region includes a second object in a type different from the predetermined type, and newly sets a second threshold smaller than the first threshold, and wherein the removing unit removes from the object region, in a case where the second threshold is newly set, noise having a size smaller than a size specified by the second threshold.

2. The apparatus according to claim 1, wherein the setting unit makes the first threshold smaller as the size of the object region becomes smaller.

3. The apparatus according to claim 1, wherein the object region is a rectangular region, and the setting unit makes the first threshold smaller as the size of a short side of the rectangle becomes smaller.

4. The apparatus according to claim 1, wherein the first object is a character, and the setting unit sets the first threshold such that the size specified by the first threshold becomes smaller than a size of a smallest character type in a font size of the character included in the object region.

5. The apparatus according to claim 1, wherein the setting unit newly sets, in a case where the area of the object region is greater than the predetermined threshold, the second threshold in accordance with a predetermined condition other than the size of the object region.

6. The apparatus according to claim 5, wherein the object region is a rectangular region, and the predetermined condition is a condition concerning a ratio of a long side of the rectangle to a short side.

7. The apparatus according to claim 6, wherein the setting unit makes, in a case where the area of the object region is greater than the predetermined threshold, the second threshold smaller as the ratio becomes closer to 1.

8. The apparatus according to claim 1, wherein the removing unit
  detects an isolated point as the noise included in the object region in binary data obtained by binarizing the image data, and
  removes the isolated point if the isolated point is smaller than the size specified by the first threshold or the second threshold.

9. An image processing method comprising:
acquiring image data generated by reading an original;
specifying an object region including a first object in a predetermined type in the acquired image data;
setting a first threshold to be used to remove noise from the specified object region, for each such specified object region, in accordance with size of the object region; and
removing, from the object region, noise with a size smaller than a size specified by the first threshold,
wherein in setting of the first threshold, in a case where an area of the object region is greater than a predetermined threshold, said step of setting determines that the object region includes a second object in a type different from the predetermined type, and newly sets a second threshold smaller than the first threshold, and wherein in removing of noise from the object region, in a case where the second threshold is newly set, noise having a size smaller than a size specified by the second threshold is removed.

10. The method according to claim 9, wherein the first threshold is set smaller as the size of the object region becomes smaller.

11. The method according to claim 9, wherein the object region is a rectangular region, and the first threshold is set smaller as the size of a short side of the rectangle becomes smaller.

12. The method according to claim 9, wherein the first object is a character, and the first threshold is set such that the size specified by the first threshold becomes smaller than a size of a smallest character type in a font size of the character included in the object region.

13. The method according to claim 9, wherein in a case where the area of the object region is greater than the predetermined threshold, the second threshold is set in accordance with a predetermined condition other than the size of the object region.

14. The method according to claim 13, wherein the object region is a rectangular region, and the predetermined condition is a condition concerning a ratio of a long side of the rectangle to a short side.

15. The method according to claim 14, wherein in a case where the area of the object region is greater than the predetermined threshold, the second threshold is set smaller as the ratio becomes closer to 1.

16. A non-transitory computer-readable storage medium storing a program configured to cause a computer to function to:
acquire image data generated by reading an original;
specify an object region including a first object in a predetermined type in the acquired image data;
set a first threshold to be used to remove noise from the specified object region, for each such specified object region, in accordance with size of the object region; and
remove, from the object region, noise with a size smaller than a size specified by the first threshold,
wherein in setting of the first threshold, in a case where an area of the object region is greater than a predetermined threshold, there is a determination that the object region includes a second object in a type different from the predetermined type, and a second threshold smaller than the first threshold is newly set, and
wherein in removing of noise from the object region, in a case where the second threshold is newly set, noise having a size smaller than a size specified by the second threshold is removed.

* * * * *